United States Patent
Wu et al.

(10) Patent No.: US 8,594,179 B2
(45) Date of Patent: Nov. 26, 2013

(54) RATE CONTROL METHOD AND APPARATUS

(75) Inventors: Haihua Wu, Shanghai (CN); Zhenghua Zhou, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 1566 days.

(21) Appl. No.: 11/402,480

(22) Filed: Apr. 11, 2006

(65) Prior Publication Data

US 2007/0014352 A1    Jan. 18, 2007

(30) Foreign Application Priority Data

Jul. 14, 2005    (WO) ................ PCT/CN2005/001047

(51) Int. Cl.
*H04N 7/12* (2006.01)
*H04N 11/02* (2006.01)
*H04N 11/04* (2006.01)

(52) U.S. Cl.
USPC ............ 375/240.01; 375/240.02; 375/240.12; 375/240.26

(58) Field of Classification Search
USPC .............. 375/240.01, 240.02, 240.12, 240.26
See application file for complete search history.

(56) References Cited

U.S. PATENT DOCUMENTS

| | | | |
|---|---|---|---|
| 5,949,490 A | 9/1999 | Borgwardt et al. | |
| 6,141,380 A | 10/2000 | Krishnamurthy et al. | |
| 6,229,849 B1 * | 5/2001 | Mihara | 375/240.05 |
| 6,366,704 B1 | 4/2002 | Ribas-Corbera et al. | |
| 6,937,770 B1 * | 8/2005 | Oguz et al. | 382/235 |
| 7,356,079 B2 * | 4/2008 | Laksono et al. | 375/240.03 |
| 7,453,938 B2 * | 11/2008 | Haskell et al. | 375/240.03 |

FOREIGN PATENT DOCUMENTS

| | | |
|---|---|---|
| KR | 1999/0088475 | 12/1999 |
| WO | WO-01/80570 A2 | 10/2001 |
| WO | WO 02/096120 A1 | 11/2002 |
| WO | WO-2007/006181 A1 | 1/2007 |

OTHER PUBLICATIONS

PCT, International Search Report and Written Opinion of the International Searching Authority, Application No. PCT/CN/2005/001047, mailed Apr. 27, 2006.
PCT, International Preliminary Report on Patentability (Chapter I of the Patent Cooperation Treaty), Application No. PCT/CN/2005/001047, Dated Jan. 16, 2008.
Ribas-Corbera, et al: Rate Controlin DCT Video Coding for Low-Delay Communications; IEEE Transaction on circuits and Systems for Video Technology, vol. 9, No. 1, Feb. 1999, pp. 172-185.
First Office Action, Aug. 21, 2009, 5 pages, Chinese Application No. 200580051052.0.
Office Action, Jul. 28, 2009, 9 pages, German Application No. 11 2005 003 628.6.
Notice of Preliminary Rejection, Sep. 15, 2009, 9 pages, Korean Application No. 10-2008-7001027.

* cited by examiner

*Primary Examiner* — Sath V Perungavoor
*Assistant Examiner* — Geepy Pe
(74) *Attorney, Agent, or Firm* — Blakely, Sokoloff, Taylor & Zafman LLP

(57) ABSTRACT

A rate control method comprises determining a target buffer fullness for each frame of a plurality of frames, obtaining a real buffer fullness for a previous frame of the plurality of frames; determining a target allocation for a current frame based on the real buffer fullness and target buffer fullness for the previous frame, wherein at least two frames of the plurality of frames have different target buffer fullness.

26 Claims, 6 Drawing Sheets

RATE CONTROL METHOD AND APPARATUS

This U.S. Patent application claims priority to PCT/CN2005/001047 previously filed in China on Jul. 14, 2005.

BACKGROUND

Generally, in case of encoding source video stream into groups of pictures (GOPs) with a predetermined format and transmitting the GOPs over a communication channel under a target rate, a video processor may comprise an encoder to encode the source video stream, a controller to control an output rate of the encoder and a buffer to temporarily store the GOPs before being transmitted over the channel. The controller may control a target allocation (e.g., target bit number) for the encoder to encode a current frame based on a predetermined target fullness for a buffer.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE PREFERRED EMBODIMENTS

The following description describes techniques for memory writing method and system. In the following description, numerous specific details such as logic implementations, pseudo-code, means to specify operands, resource partitioning/sharing/duplication implementations, types and interrelationships of system components, and logic partitioning/integration choices are set forth in order to provide a more thorough understanding of the current invention. However, the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, that may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.) and others.

Figure 1:
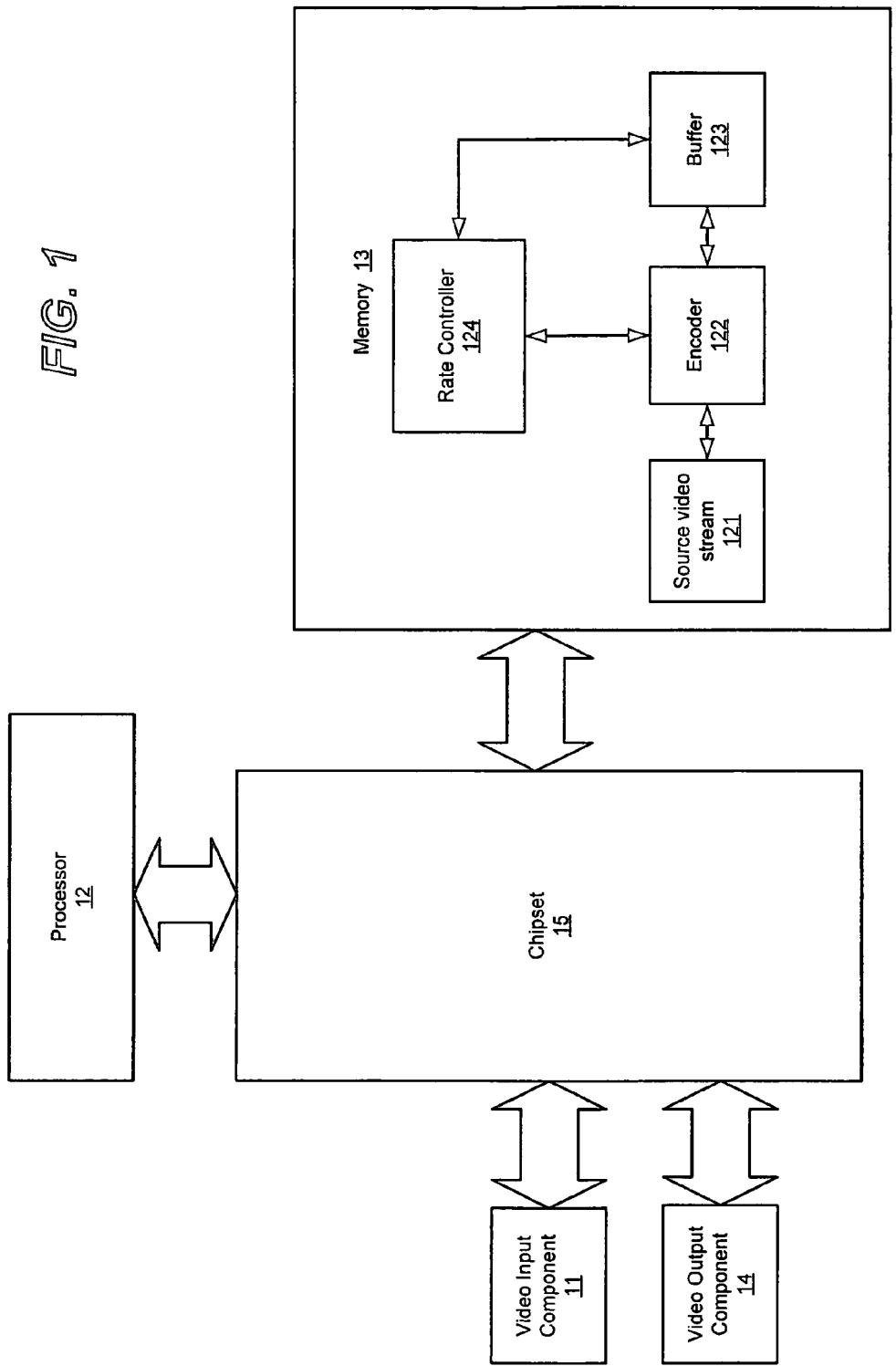
FIG. 1 is an embodiment of a video processing system.

FIG. 1 shows an embodiment of a video processing system. A non-exhaustive list of examples for the video processing system may include distributed computing systems, supercomputers, computing clusters, mainframe computers, minicomputers, client-server systems, personal computers, workstations, portable computers, laptop computers, mobile phones or personal data assistants (PDA), or other device capable of video processing and transmission.

In an embodiment, the video processing system may comprise a video input component 11, one or more processors 12, memory 13, video output component 14, and chipset 15. The video input component 11 may input a source video stream. In an embodiment, the video input component may comprise a source image input component to input source images, and a pre-processing component to pre-process the source image before being encoded. Examples for the source image input component may comprise a camera header for capture a source image, a source image reader to read a source image from an image record medium, such as a film and the like. Examples for the pre-processing component may comprise an analog-to-digital converter to convert the analog source images into a digital source video stream.

The one or more processors 12 are communicatively coupled to various components (e.g., the memory 13) via one or more buses such as a processor bus.

The processors 12 may be implemented as an integrated circuit (IC) with one or more processing cores. The processor 12 may comprise a microprocessor such as an Intel® Pentium® 4 processor or an Intel® XScale® processor to execute instructions to perform various tasks. In particular, the processor 12 may execute instructions to control encoding and decoding of video streams.

The memory 13 may store codes to be executed by the processor 12. In an embodiment, the memory 13 may store the source video stream 121 input from the video input component 11, an encoder 122 to encode the source video stream into groups of pictures (GOPs) comprising a plurality of frames under various video coding standards, such as MPEG-1, MPEG-2, MPEG-4, H.261, H.263, H.264, AVS (video); a buffer 123 to temporarily store the frames; a rate controller 124 to control an output rate for the encoder 122 to output the frames to the buffer 123.

The rate controller 124 may control a target allocation (e.g., a target bit number) for a current frame to be encoded (e.g., the $n^{th}$ frame of a GOP), and the encoder 122 may encode the current frame with an actual allocation (e.g., an actual bit number) that is determined based on the target allocation output from the rate controller 124. In an embodiment, the rate controller may control the target allocation for the current frame according to a real buffer fullness at the time after a previous frame (e.g., the $(n-1)^{th}$ frame of the GOP) enters the buffer 123, and a target buffer fullness for the previous frame. In another embodiment, if the current frame is a starting frame of the GOPs, the real buffer fullness for the 'previous frame' and its target buffer fullness may be predetermined.

The video output component 14 may output the frames in the buffer 123. In an embodiment, the video output component 14 may output the frames through a communication channel with a target rate. Examples for the video output component 14 may comprise a network card, blue tooth, or the like. The chipset 15 may provide one or more communicative path among the video input component 11, the processor 12, memory 13 and the video output component 14.

Other embodiments may implement other modifications and variations to the structure of the aforementioned video processing system 10. For example, the video processing system 10 may further comprise other I/O components than the video input/output components as depicted in FIG. 1. For another example, the video processing system 10 may further comprise a BIOS firmware that may store routines that the video processing system 10 executes during system startup in order to initialize the processors 12, chipset 15, and other components of the video processing system 10.

Figure 2:
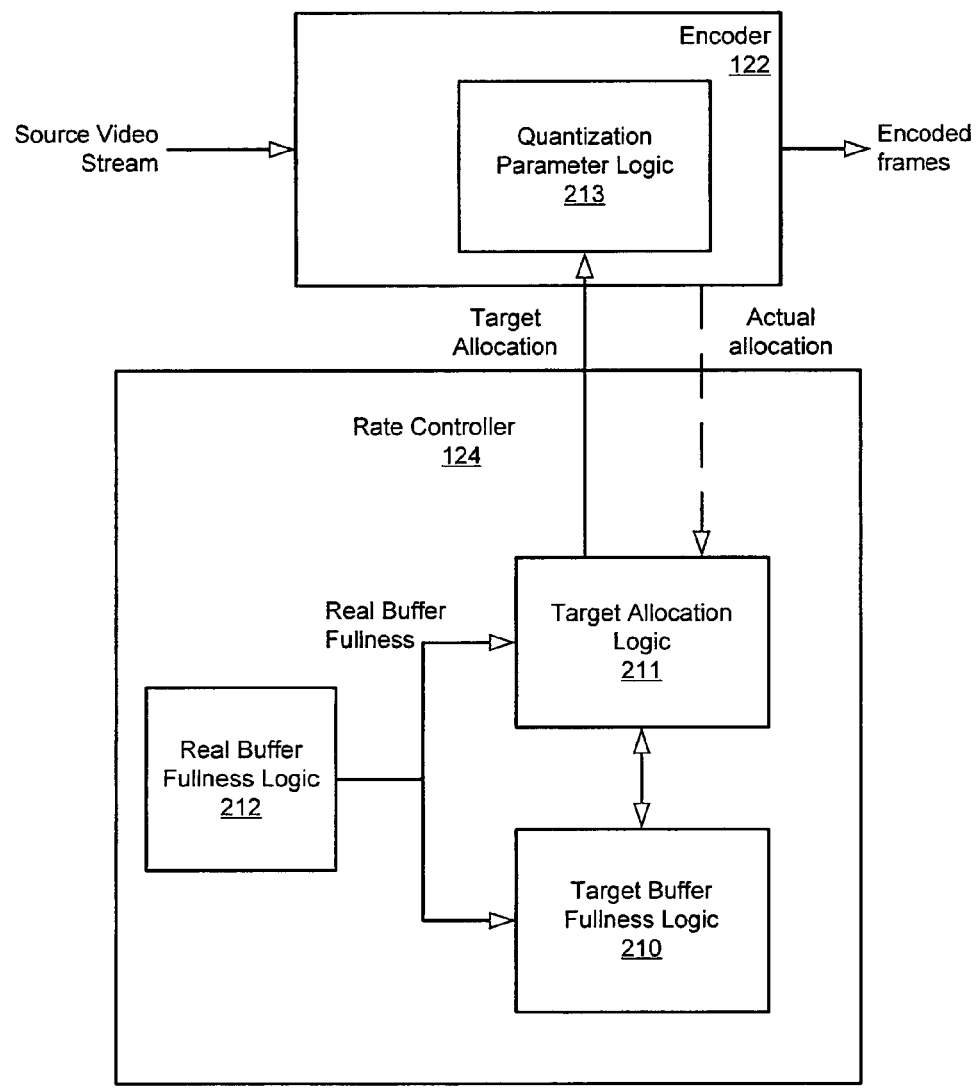
FIG. 2 is an embodiment of a controller in the video processing system of FIG. 1.

FIG. 2 shows an embodiment of the rate controller 124 in FIG. 1. The rate controller 124 may comprise a target buffer fullness logic 210 and a target allocation logic 211. The target buffer fullness logic 210 may determine a target buffer fullness for each frame of a GOP so as to form a target buffer fullness pattern for the GOP where at least two frames of the GOP have different target buffer fullness.

Figure 5:
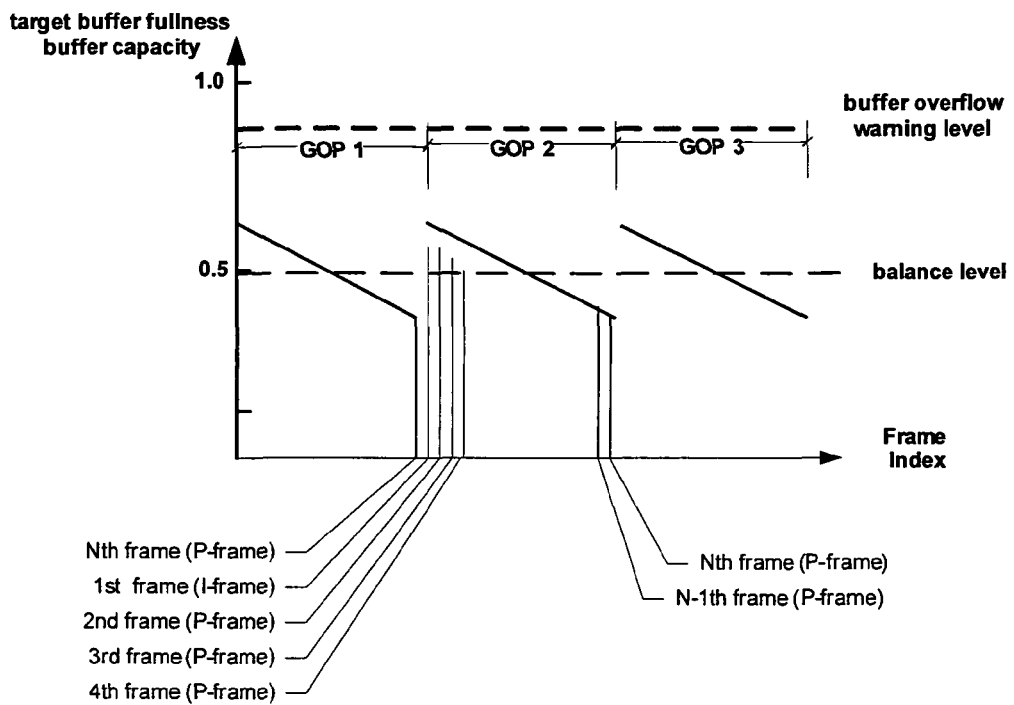
FIG. 5 is an example for a target buffer fullness pattern.
Figure 6:
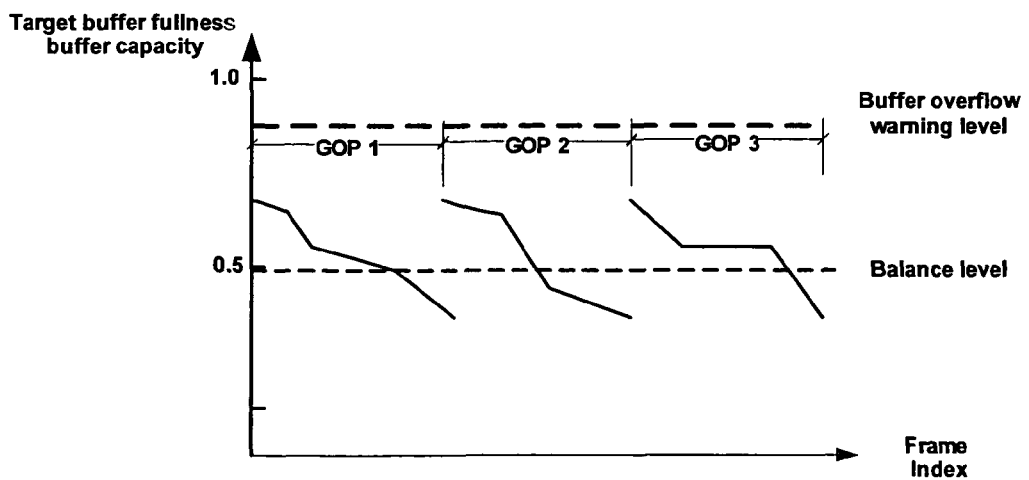
FIG. 6 is another example for a target buffer fullness pattern.

FIGS. 5 and 6 depict two examples for the target buffer fullness patterns. As depicted in FIG. 5, the target buffer fullness pattern may be a slope line with the target buffer fullness for the first frame of a GOP higher than that for its last frame. The target buffer fullness pattern of FIG. 5 may be suitable for the case that a GOP may commence with one or more Intra-coded picture frame (i.e., I frame) that may be followed by a plurality of inter-coded picture frames (i.e., P frame) and/or bi-directionally predicted frames (i.e., B frame). Generally, the I-frame may consume more bit allocation than the P-frame or B-frame.

As depicted in FIG. 6, the target buffer fullness pattern may be a zigzag like pattern with the target buffer fullness for the first frame of a GOP higher than that for its last frame. The target buffer fullness pattern of FIG. 6 may be suitable not only for the case described with reference to FIG. 5, but also for the case that the complexity of a GOP is inconsistent within the GOP, for example, the complexity for the first to fifth frames is higher than that for the sixth to tenth frames but lower than that for the eleventh to fifteenth frames, and so on. In other embodiments, the target buffer fullness pattern may have forms other than those depicted in FIGS. 5 and 6.

The target buffer fullness for each frame may be determined in various manners. In an embodiment, the target buffer fullness may be determined before encoding the starting frame of a GOP according to certain factor(s), such as a real buffer fullness at the time before encoding the starting frame, and/or an estimation of picture complexity, etc. In another embodiment, the target buffer fullness for each frame of a GOP may be adaptively determined before or during the process of encoding the GOP. For example, the target buffer fullness for each frame of a GOP (e.g., the GOP 2 in FIG. 5) may be determined before encoding the GOP according to a real buffer fullness and a target buffer fullness for a frame of another GOP (e.g., the last frame of the GOP 1 in FIG. 5), or the target buffer fullness may be determined during the process of encoding the GOP according to a real buffer fullness and a target buffer fullness for a frame of the GOP (e.g., a first frame of the GOP 2 in FIG. 5).

The target allocation logic 211 may determine a target allocation for a current frame of a GOP (e.g., the $4^{th}$ frame of GOP 2 in FIG. 5) according to the real buffer fullness for a previous frame (e.g., the $3^{rd}$ frame of GOP 2 in FIG. 5) that is output from the buffer 123 and the target buffer fullness for the previous frame that is output from the target buffer fullness logic 210. In an embodiment, the target allocation logic 211 may determine the target allocation for the current frame to be larger than an average target allocation if the real buffer fullness for the previous frame is less than its target buffer fullness and vise versa. The average target allocation may be determined according to a predetermined target rate for the video output component 14 to output the encoded frames from the buffer 123 and a predetermined frame rate. In another embodiment, if the real buffer fullness for the previous frame is larger than a predetermined threshold, for example, a buffer overflow warning level, the target allocation logic 211 may determine the target allocation for the current frame as zero, namely, the encoder 122 may skip encoding the current frame.

In an embodiment, the rate controller 124 may further comprise a real buffer fullness logic 212 to compute a real buffer fullness for a frame instead of obtaining the real buffer fullness from the buffer 123. For example, the real buffer fullness logic 212 may compute a real buffer fullness for a frame (i.e., the real buffer fullness after the frame enters the buffer 123) according to a real buffer fullness for another frame that is encoded previously to the frame, an actual allocation for the another frame that is determined by the encoder 122, and the average target allocation.

The encoder 122 may further comprise a quantization parameter logic 213 to compute a quantization parameter for a frame and/or a plurality of blocks of the frame according to the target allocation for the frame and the estimation of the picture complexity, so that the encoder 122 may encode the frame based on the quantization parameter. Alternatively, the quantization parameter logic 213 may be located inside of the rate controller 124.

Figure 3:
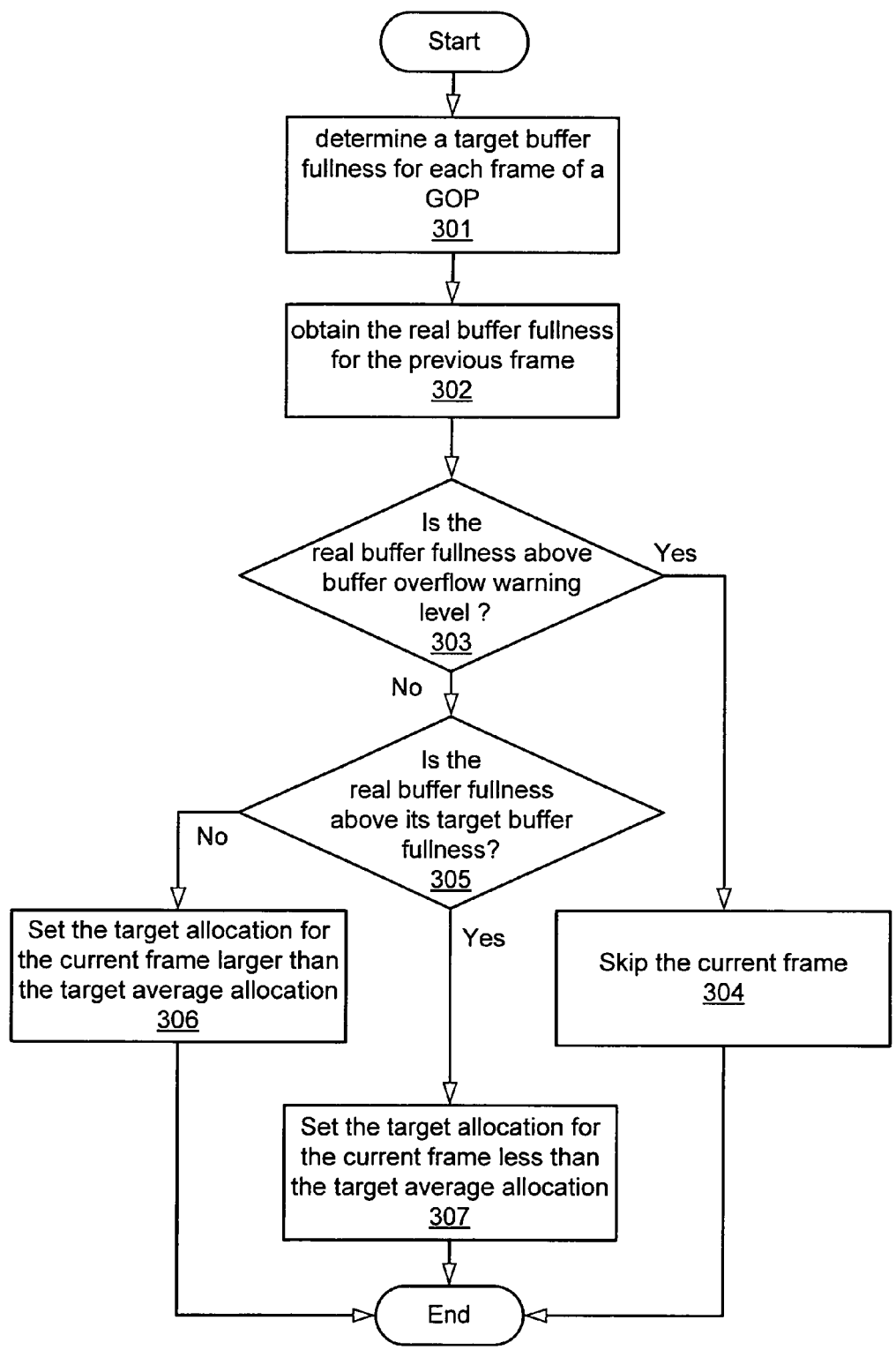
FIG. 3 is an embodiment of a rate control method.
Figure 4:
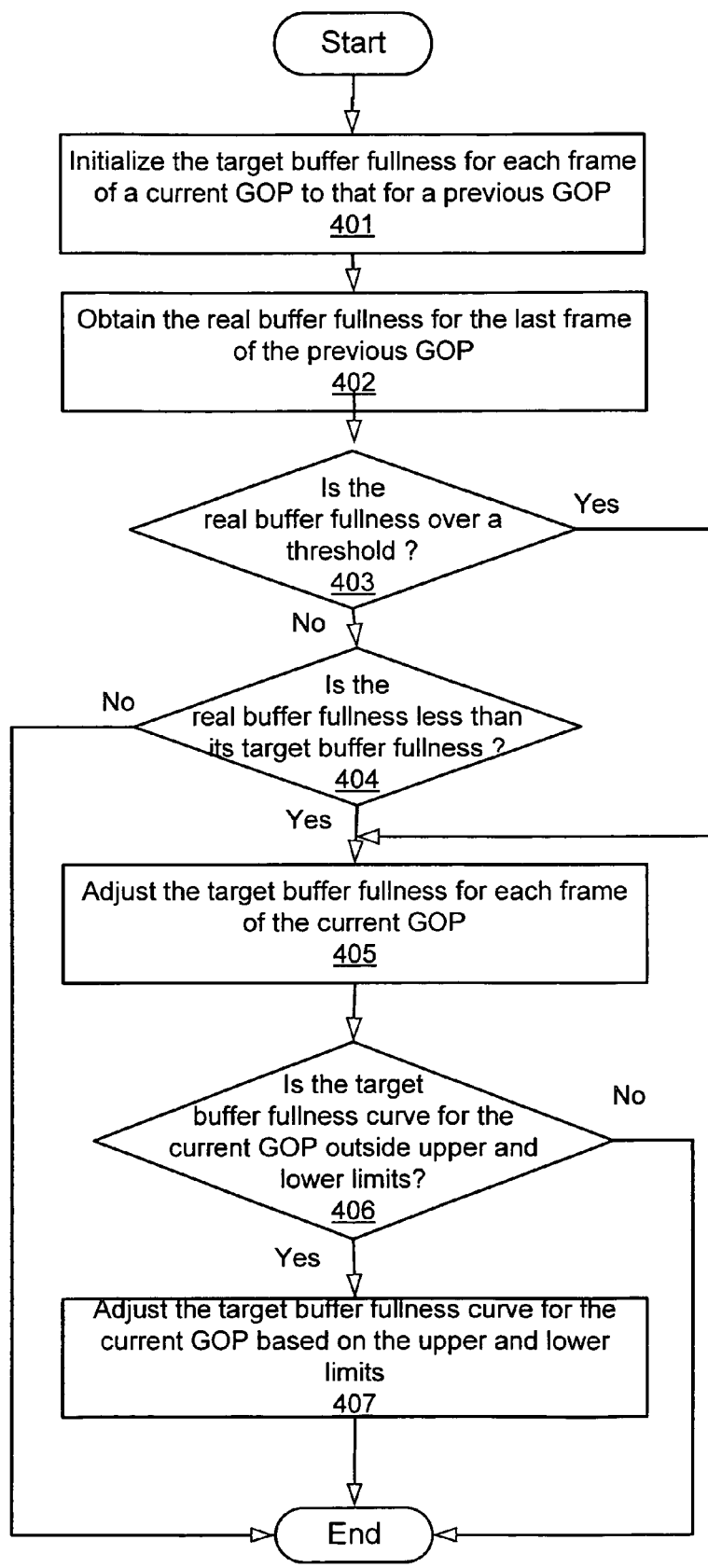
FIG. 4 is an embodiment of a method for adaptively determining a target buffer fullness used in the rate control method of FIG. 3.

With reference to FIGS. 3 and 4, an embodiment of a rate control method will be described in detail. FIG. 3 shows an embodiment of a rate control method. The rate control method may be implemented by the rate controller 124 of FIG. 1. In block 301, the target buffer fullness logic 210 of the controller 124 may determine a target buffer fullness for each frame of a GOP. The GOP may comprise a previous frame (e.g., the $(n-1)^{th}$ frame) that is encoded before a current frame (e.g., the $n^{th}$ frame). As mentioned above with reference to FIG. 2, the target buffer fullness for each frame of the GOP may be pre-determined before encoding a starting frame of the GOPs, or may be adaptively determined before or during the process of encoding the GOP. Embodiments of adaptively determine a target buffer fullness for each frame of a GOP will be described with reference to FIG. 4 later.

In block 302, the target allocation logic 211 may obtain a real buffer fullness for the previous frame. The real buffer fullness for the previous frame can be obtained from the buffer 123 or be obtained by computing a real buffer fullness for another frame (e.g., the $(n-2)^{th}$ frame) that is encoded before the previous frame with the following formula:

$$BF_{n-1}=BF_{n-2}+AL_{n-1}-R/F$$

wherein, $BF_{n-1}$ represents the real buffer fullness for the $(n-1)^{th}$ frame; $BF_{n-2}$ represents the real buffer fullness for the $(n-2)^{th}$ frame; $AL_{n-1}$ represents the actual allocation of the $(n-1)^{th}$ frame; R represents a target rate for the video output component 14 to output the frames from the buffer 123; F means a target frame rate.

In block 303, the target allocation logic 211 of the rate controller 124 may determine whether the real buffer fullness for the previous frame is above a buffer overflow warning level. If so, the target allocation logic 211 may determine the target allocation for the current frame is zero (block 304).

If the target allocation logic 211 determines that the real buffer fullness for the previous frame is below the buffer overflow warning level in block 303, then the target allocation logic 211 may continue to determine whether the real buffer fullness is above its target buffer fullness in block 305. The target allocation logic 211 may implement block 305 in various ways. In an embodiment, the target buffer fullness for each frame of the GOP that is determined in block 301 may be stored in a table. Then, the target allocation logic 211 may obtain the target buffer fullness for the previous frame by searching for an entry corresponding to the previous frame from the table and then determine whether the real buffer fullness is above its target buffer fullness or not. In another embodiment, if the target buffer fullness pattern for the GOP is a slope as depicted in FIG. 5, the rate controller 124 may determine whether the real buffer fullness for the previous frame is greater than $$A + \frac{C}{2} - \frac{C \cdot ((i-1) \bmod N)}{N},$$

wherein A is a middle point level of the target buffer fullness pattern for the GOP, C is a peak-peak difference between the highest and lowest points of the slope, i the frame index of the previous frame and N is the frame number of the GOP, while $1 \le i \ge N$.

If the target allocation logic 211 determines in block 305 that the real buffer fullness for the previous frame is not above its target buffer fullness, then the target allocation logic 211 may determine the target allocation for the current frame to be larger than an average target allocation (block 306). In an embodiment, the target allocation logic 211 may compute the target allocation for the current frame with the following formula:

$TL_n = R/F + \Delta_1$ wherein, $TL_n$ is the target allocation for the $n^{th}$ frame (i.e., the current frame), R/F means the average target bit number that is computed based on the target rate R and the target frame rate F; $\Delta_1$ is the an increment. In an embodiment, the increment $\Delta_1$ may be the difference between the real buffer fullness and the target buffer fullness for the previous frame. However, the increment $\Delta_1$ may comprise any value determined in compliance with the buffer capacity and/or characteristics of the GOP, such as length and complexity of the GOP.

However, the target allocation logic 211 determines in block 305 that the real buffer fullness for the previous frame is above its target buffer fullness, then the target allocation logic 211 may determine the target bit number for the current frame to be less than the average target bit number (block 507). For example, the controller may compute the target bit number for the current frame with the following formula:

$TL_n = R/F - \Delta_2$ wherein, $\Delta_2$ means a decrement. In an embodiment, the decrement $\Delta_2$ may be determined based on the real buffer fullness for the previous frame and the target frame rate, such as $BF_{n-1}/F$. However, the decrement $\Delta_2$ may comprise any value determined in compliance with the buffer capacity and/or characteristics of the GOP, such as length and complexity of the GOP.

The above-described method may be applied to determine the target bit number of the starting frame of the GOPs, except that the real buffer fullness for the 'previous frame' is predetermined, so is its corresponding target buffer fullness.

FIG. 4 shows an embodiment of adaptively determining a target buffer fullness for each frame of a GOP (e.g., a current GOP) that is used in the method of FIG. 3. In block 401, the target buffer fullness logic 210 of the rate controller 124 may initialize the target buffer fullness for each frame of the current GOP to a certain value. In an embodiment, the target buffer fullness may be initialized to values used for each frame of another GOP, for example, the GOP that may be encoded previously to the currently GOP (e.g., a previous GOP). However, other embodiments may implement other modifications and variations to block 401.

In block 402, the target buffer fullness logic 210 may obtain a real buffer fullness for a frame of the previous GOP, e.g., its last frame. The target buffer fullness logic 210 may implement block 402 in various ways. In an embodiment, the target buffer fullness logic 210 may obtain the real buffer fullness for the last frame from the buffer 123. In another embodiment, the target buffer fullness logic 210 may obtain the real buffer fullness from the real buffer fullness logic 212 that may compute the real buffer fullness with the formula $BF_{n-1} = BF_{n-2} + AL_{n-1} - R/F$.

In block 403, the target buffer fullness logic 210 may determine whether the real buffer fullness for the last frame of the previous GOP is over a pre-determined threshold. In an embodiment, the threshold is determined to be half of the buffer capacity. In other embodiments, the threshold may have other values as long as in compliance with the buffer capacity and/or the characteristics of the current GOP, such as length and complexity of the current GOP.

If in block 403, the target buffer fullness logic 210 determines that the real buffer fullness for the last frame is over the pre-determined threshold, then the target buffer fullness logic 210 may adjust the target buffer fullness for each frame of the current GOP in block 405. In an embodiment, if the target buffer fullness pattern is a slope line or a zigzag line as depicted in FIGS. 5 and 6, the target buffer fullness logic 210 may implement the adjustment so as to increase the gradient of the slope line or zigzag line, for example, the gradient may be increased by one or more steps (e.g., one step=5°). However, other embodiments may implement other modifications and variations to block 405.

If, in block 403, the target buffer fullness logic 210 determines that the real buffer fullness for the last frame of the previous GOP is less than the pre-determined threshold, then the target buffer fullness logic 210 may continue to determine whether the real buffer fullness for the last frame is less than its target buffer fullness in block 404. As described above, the target buffer fullness logic 210 may obtain the target buffer fullness for the last frame in various ways. In an embodiment, the target buffer fullness may be obtained by searching for an entry storing the target buffer fullness corresponding to the last frame from a table. In another embodiment, if the target buffer fullness pattern for the previous GOP is a slope as depicted in FIG. 5, the target buffer fullness may be obtained with the following formula:

$$TBF_N = A + \frac{C}{2} - \frac{C \cdot ((N-1) \bmod N)}{N}$$

wherein $TBF_N$ is the target buffer fullness for the $N^{th}$ frame (i.e., the last frame).

If the target buffer fullness logic 210 determines that the real buffer fullness for the last frame is no less than its target buffer fullness in block 404, then the method of FIG. 4 may go to the end, namely, the target buffer fullness logic 210 may keep the initialized target buffer fullness for each frame of the current GOP unchanged. However, if not, then the target buffer fullness logic 210 may adjust the target buffer fullness for each frame of the current GOP in block 405. In an embodiment, if the target buffer fullness pattern is a slope line or a zigzag line as depicted in FIGS. 5 and 6, the target buffer fullness logic 210 may implement the adjustment so as to decrease the gradient of the slope line or zigzag line, for example, the gradient may be decreased by one or more steps (e.g., one step=5°). However, other embodiments may implement other modifications and variations to block 405.

Figure 7:
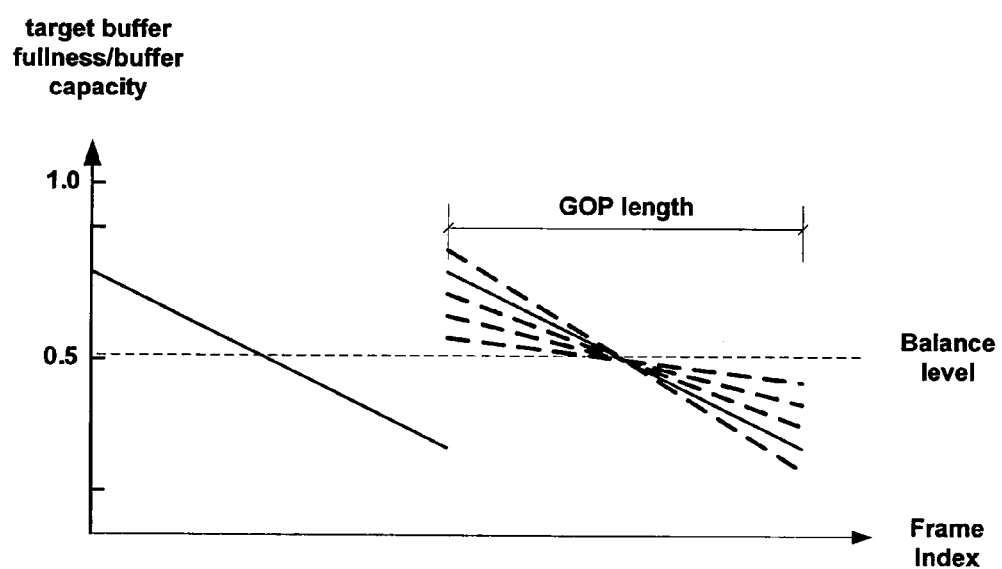
FIG. 7 is an example of a target buffer fullness pattern that is adaptively determined according to a method of FIG. 4.

FIG. 7 shows an example for adjusting the gradient of the target buffer fullness pattern for the current GOP. As shown, the gradient is adjusted with reference to a balance level (e.g., half capacity of the buffer). Other embodiments may adjust the gradient with other references than the balance level.

Referring back to FIG. 4, in block 406, the target buffer fullness logic 210 may further determine whether the target buffer fullness for at least one frame of the current GOP lies beyond a scope defined by predetermined upper and lower limits. If so, the target buffer fullness logic 210 may further adjust the target buffer fullness for at least one frame of the current GOP based on the upper and lower limits in block 407. If not, the method of FIG. 4 may goes to the end, that means the target buffer fullness for each frame of the current GOP is determined to be the one as adjusted in block 405.

As mentioned above, the target buffer fullness for each frame of a starting GOP of the GOPs may be predetermined according to certain factor(s). An embodiment of a method to determine a target buffer fullness for each frame of a GOP has been described with reference to FIG. 4. However, other embodiments may implement other modifications or variations to the method of FIG. 4. For example, FIG. 4 shows the target buffer fullness for each frame of the GOP is determined before encoding the GOP. However, other embodiments may determine the target buffer fullness for the GOP at other time points, such as after encoding the first frame of the GOP.

In that case, the target buffer fullness logic 210 may first initialize the target buffer fullness for each frame of the GOP to the same values as those of another GOP. After the encoder 122 encodes the first frame of the GOP and outputs the encoded frame to the buffer 123, the target buffer fullness logic 210 may obtain a real buffer fullness for the first frame. Then, the real buffer fullness may be compared with a predetermined buffer overflow warning level and its target buffer fullness. If the real buffer fullness is over the warning level or less than its target buffer fullness, the target buffer fullness for each frame of the GOP may be adjusted. In an embodiment, if the target buffer fullness pattern of the GOP is a slope line or a zigzag line, the target buffer fullness logic 210 may implement the adjustment so as to increase (in the case that the real buffer fullness is over the warning level) or decrease (in the case that the real buffer fullness is less than its target buffer fullness) the gradient of the slope line or the zigzag line. Then, the target buffer fullness logic 210 may further modify the result target buffer fullness for at least one frame of the GOP if the real buffer fullness lies beyond a scope defined by predetermined upper and lower limits.

Although the current invention has been described in conjunction with certain embodiments, it shall be understood that modifications and variations may be resorted to without departing from the spirit and scope of the invention as those skilled in the art readily understand. Such modifications and variations are considered to be within the scope of the invention and the appended claims.

What is claimed is:

1. A method, comprising:
   determining a target buffer fullness for each frame of a plurality of frames, wherein at least two frames of the plurality of frames have different target buffer fullness;
   determining a target buffer fullness pattern based on the determined target buffer fullness for each frame of the plurality of frames, the target buffer fullness pattern having a gradient;
   performing a rate control based on the target buffer fullness for each frame of the plurality of frames;
   modifying the rate control for the current frame based on the target buffer fullness pattern, by comparing the real buffer fullness for the previous frame to a value determined based on a middle point level of the target buffer fullness pattern and a peak-to-peak difference of the target buffer fullness pattern; and
   encoding a current frame at a rate based on the rate control.

2. The method of claim 1, wherein performing the rate control further comprises obtaining a real buffer fullness for a previous frame of the plurality of frames, and determining a target allocation for a current frame based on the real buffer fullness and the target buffer fullness for the previous frame.

3. The method of claim 2, wherein determining the target allocation further comprises determining the target allocation for the current frame as zero when the real buffer fullness for the previous frame is above a buffer overflow warning level.

4. The method of claim 1, wherein determining the target allocation further comprises
   determining the target allocation for the current frame to be larger than an average target allocation, when the real buffer fullness for the previous frame is lower than the target buffer fullness for the previous frame, wherein the average target allocation is determined according to a predetermined target rate and a predetermined target frame rate, and
   determining the target allocation for the current frame to be lower than the average target allocation, when the real buffer fullness for the previous frame is larger than the target buffer fullness for the previous frame.

5. The method of claim 1, wherein determining the target buffer fullness further comprises adaptively determining the target buffer fullness for at least one frame of the plurality of frames.

6. The method of claim 5, wherein adaptively determining the target buffer fullness further comprises
   initializing the target buffer fullness for each frame of the plurality of frames to the target buffer fullness for each frame of another plurality of frames previous to the plurality of frames, and
   adjusting the target buffer fullness for at least one frame of the plurality of frames based on the real buffer fullness and target buffer fullness for a last frame of the another plurality of frames.

7. The method of claim 5, wherein adaptively determining the target buffer fullness further comprises initializing the target buffer fullness for each frame of the plurality of frames to the target buffer fullness for each frame of another plurality of frames previous to the plurality of frames, and adjusting the target buffer fullness for at least one frame of the plurality of frames based on the real buffer fullness and target buffer fullness for a first frame of the plurality of frames.

8. An apparatus, comprising:

a target buffer fullness logic to determine a target buffer fullness for each frame of a plurality of frames wherein at least two frames of the plurality of frames have different target buffer fullness, the plurality of frames comprising a previous frame, and to determine a target buffer fullness pattern based on the determined target buffer fullness for each frame of the plurality of frames, the target buffer fullness pattern having a gradient;

a rate control logic to determine a rate control based on the target buffer fullness for each frame of the plurality of frames and to modify the rate control for the current frame based on the target buffer fullness pattern by comparing the real buffer fullness for the previous frame to a value determined based on a middle point level of the target buffer fullness pattern and a peak-to-peak difference of the target buffer fullness pattern; and a frame encoder to encode a current frame at a rate based on the rate control.

9. The apparatus of claim 8, further comprising a real buffer fullness logic to compute the real buffer fullness for the previous frame based on an actual allocation for the previous frame and an average target allocation that is determined based on a predetermined target rate and a predetermined frame rate.

10. The apparatus of claim 8, wherein the target allocation logic further determines the target allocation for the current frame as zero when the real buffer fullness for the previous frame is above a buffer overflow warning level.

11. The apparatus of claim 8, wherein the target allocation logic further determines the target allocation for the current frame to be larger than an average target allocation, when the real buffer fullness for the previous frame is lower than the target buffer fullness for the previous frame, and determines the target allocation for the current frame to be lower than the average target allocation, when the real buffer fullness for the previous frame is larger than the target buffer fullness for the previous frame, and the average target allocation is determined according to a predetermined target rate and a predetermined target frame rate.

12. The apparatus of claim 8, wherein the target buffer fullness logic adaptively determining the target buffer fullness for at least one frame of the plurality of frames.

13. The apparatus of claim 12, wherein the target buffer fullness logic initializes the target buffer fullness for each frame of the plurality of frames to the target buffer fullness for each frame of another plurality of frames previous to the plurality of frames, and adjusts the target buffer fullness for at least one frame of the plurality of frames based on the real buffer fullness and target buffer fullness for a last frame of the another plurality of frames.

14. The apparatus of claim 12, wherein the target buffer fullness logic initializes the target buffer fullness for each frame of the plurality of frames to the target buffer fullness for each frame of another plurality of frames previous to the plurality of frames, and adjusts the target buffer fullness for at least one frame of the plurality of frames based on the real buffer fullness and target buffer fullness for a first frame of the plurality of frames.

15. A system, comprising an input component to input a video stream, an encoder to encode the video stream into a plurality of frames with a predetermined format, and a controller to control a rate of outputting the plurality of frames from the encoder by determining a target buffer fullness for each frame of a plurality of frames, determining a target buffer fullness pattern based on the determined target buffer fullness for each frame of a plurality of frames, wherein at least two frames of the plurality of frames have different target buffer fullness, performing a rate control based on the target buffer fullness for each frame of the plurality of frames, by comparing the real buffer fullness for the previous frame to a value determined based on a middle point level of the target buffer fullness pattern and a peak-to-peak difference of the target buffer fullness pattern.

16. The system of claim 15, further comprising a buffer to store the plurality of frames output from the encoder before transmitting the plurality of frames with a predetermined target rate.

17. The system of claim 15, wherein the controller determines a target buffer fullness for each frame of the plurality of frames, the plurality of frames comprising a previous frame, determines a real buffer fullness for the previous frame, and determines a target allocation for a current frame based on the real buffer fullness and target buffer fullness for the previous frame.

18. The system of claim 15, wherein the controller adaptively determines the target buffer fullness for at least one frame of the plurality of frames.

19. The system of claim 18, wherein the controller initializes the target buffer fullness for each frame of the plurality of frames to the target buffer fullness for each frame of another plurality of frames previous to the plurality of frames, and adjusts the target buffer fullness for at least one frame of the plurality of frames based on the real buffer fullness and target buffer fullness for a last frame of the another plurality of frames.

20. The system of claim 18, wherein the controller initializes the target buffer fullness for each frame of the plurality of frames to the target buffer fullness for each frame of another plurality of frames previous to the plurality of frames, and adjusts the target buffer fullness for at least one frame of the plurality of frames based on the real buffer fullness and target buffer fullness for a first frame of the plurality of frames.

21. A non-transitory computer-readable medium comprising a plurality of instructions that in response to being executed result in a computing device causing operations to be performed comprising:

determining a target buffer fullness for each frame of a plurality of frames, wherein at least two frames of the plurality of frames have different target buffer fullness;

determining a target buffer fullness pattern based on the determined target buffer fullness for each frame of the plurality of frames, the target buffer fullness pattern having a gradient;

performing a rate control based on the target buffer fullness for each frame of the plurality of frames;

modifying the rate control for the current frame based on the target buffer fullness pattern, by comparing the real buffer fullness for the previous frame to a value determined based on a middle point level of the target buffer fullness pattern and a peak-to-peak difference of the target buffer fullness pattern; and encoding a current frame at a rate based on the rate control.

22. The non-transitory machine-readable medium of claim 21 wherein the plurality of instructions further result in the computing device obtaining a real buffer fullness for a previous frame of the plurality of frames, and determining a target allocation for a current frame based on the real buffer fullness and the target buffer fullness for the previous frame.

23. The non-transitory computer-readable medium of claim 21 wherein the plurality of instructions further result in the computing device determining the target allocation for the current frame as zero when the real buffer fullness for the previous frame is above a buffer overflow warning level.

24. The non-transitory computer-readable medium of claim 21 wherein the plurality of instructions further result in the computing device determining the target allocation for the current frame to be larger than an average target allocation, when the real buffer fullness for the previous frame is lower than the target buffer fullness for the previous frame, wherein the average target allocation is determined according to a predetermined target rate and a predetermined target frame rate, and determining the target allocation for the current frame to be lower than the average target allocation, when the real buffer fullness for the previous frame is larger than the target buffer fullness for the previous frame.

25. The non-transitory computer-readable medium of claim 21 wherein the plurality of instructions further result in the computing device adaptively determining the target buffer fullness for at least one frame of the plurality of frames.

26. The non-transitory computer-readable medium of claim 25 wherein the plurality of instructions further result in the computing device initializing the target buffer fullness for each frame of the plurality of frames to the target buffer fullness for each frame of another plurality of frames previous to the plurality of frames, and updating the target buffer fullness for each frame of the plurality of frames based on the real buffer fullness and target buffer fullness for a last frame of the another plurality of frames.

\* \* \* \* \*